United States Patent [19]

Dickerson et al.

[11] Patent Number: 4,743,099
[45] Date of Patent: May 10, 1988

[54] METHOD OF MAKING A TFT LC DISPLAY HAVING POLYCHROMATIC GLASS COLOR FILTERS

[75] Inventors: Jack A. Dickerson; Charlie C. Kilmer, both of Raleigh, N.C.

[73] Assignee: International Business Machines Corporation, Armonk, N.Y.

[21] Appl. No.: 7,556

[22] Filed: Jan. 28, 1987

[51] Int. Cl.$^4$ .............................................. G02F 1/13
[52] U.S. Cl. ........................... 350/339 F; 350/320; 350/333; 65/30.1; 65/30.11
[58] Field of Search .............. 350/320, 333, 339 F, 350/331 R, 345; 65/30.1, 30.11, 33

[56] References Cited

U.S. PATENT DOCUMENTS

| | | | |
|---|---|---|---|
| 3,840,695 | 10/1974 | Fischer | 350/339 F X |
| 4,057,408 | 11/1977 | Pierson et al. | 65/30.1 X |
| 4,295,872 | 10/1981 | Luers | 65/30.1 |
| 4,328,299 | 5/1982 | Beall et al. | 65/30.1 X |
| 4,328,305 | 5/1982 | Rauscher | 65/30.1 X |
| 4,662,720 | 5/1987 | Fergason | 350/333 X |

FOREIGN PATENT DOCUMENTS

| | | | |
|---|---|---|---|
| 53-9134 | 1/1978 | Japan | 350/339 F |
| 54-11698 | 1/1979 | Japan | 350/339 F |

Primary Examiner—Stanley D. Miller
Assistant Examiner—Richard F. Gallivan
Attorney, Agent, or Firm—Gerald R. Woods

[57] ABSTRACT

A thin film transistor liquid crystal device with color capabilities can be fabricated using polychromatic glass. Polychromatic glass is a full-color photosensitive glass in which colored regions can be established through exposure to ultraviolet radiation either concurrently with or followed by heat treatment. To assure that colored regions in the polychromatic glass are aligned with individual pel electrodes, each driven by a thin film transistor, the pel electrodes are used as a shutter to control the exposure of the polychromatic glass to the ultraviolet radiation.

15 Claims, 3 Drawing Sheets

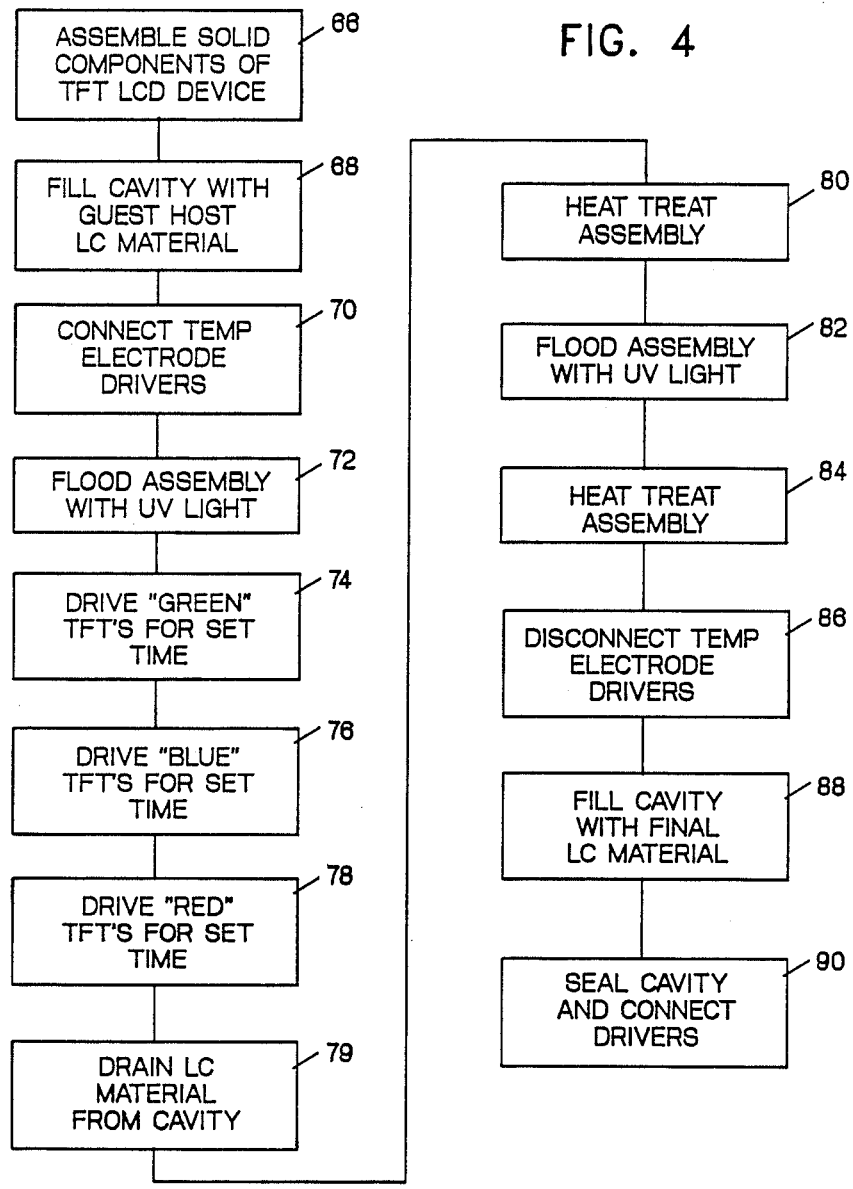

METHOD OF MAKING A TFT LC DISPLAY HAVING POLYCHROMATIC GLASS COLOR FILTERS

FIELD OF THE INVENTION

The present invention relates to liquid crystal displays and more particularly to a method of making a liquid crystal display having polychromatic or full-color photosensitive glass color filters.

DESCRIPTION OF THE PRIOR ART

Thin film transistor liquid crystal (TFT LC) display technology is being developed as a possible successor to cathode ray tube technology for color display terminals. Liquid crystal displays with a given display screen area occupy a smaller volume than cathode ray tube devices with the same screen area. This is considered significant commercially, since the smaller liquid crystal display has a smaller footprint; that is, occupies less area of a user's desk or terminal stand. Liquid crystal display devices may have lower power requirements than corresponding cathode ray tube devices. The operating voltages of liquid crystal devices are considerably lower than the operating voltages of cathode ray tube devices.

While different types of color liquid crystal display devices exist, such devices generally include two spaced glass panels which define a sealed cavity filled with a liquid crystal material. A transparent common electrode is formed on one of the glass panels. Individual electrodes are formed on the other of the glass panels. Each of the individual electrodes has a surface area corresponding to the area of one picture element or pel. Each pel is too small to be seen by the unaided human eye. If the device is to have color capabilities, it must also include color filters with red, green and blue color areas. Each color area is aligned with one of the pel-sized electrodes. Each set of red, green and blue color areas is grouped into a triad or other consistent pattern, such as repetitive stripes.

In the type of device contemplated by the present invention, each of the individual electrodes can be addressed by means of a thin film transistor. Depending upon the image to be displayed, one or more of the pel electrodes is energized during display operation to allow full light, no light or partial light to be transmitted through the color filter area associated with that pel electrode. The image perceived by a user is a blending of colors formed by the transmission of light through adjacent color filter areas.

The display may be backlighted by locating a light source on the opposite side of the display from the viewer. Alternatively, the display device may include a reflective layer at its rear surface and rely on a light source located on the same side of the display as the viewer.

Color filters for use on such devices have been fabricated using a number of different approaches. One approach has been to spin or deposit a light sensitized adhesive film onto the glass panal. The film is then patterned in three sequential steps. During each step, dye of a specific color is applied to predetermined regions of the film. According to another approach, organic pigments are deposited by vacuum evaporation. The filters are patterned using conventional photolithographic lift-off techniques. According to still another approach, a dyed and patterned stretched film material is used to create an internal color polarizing filter.

Each of these approaches has certain drawbacks. Most involve wet processing and photopatterning techniques which are relatively costly and difficult to perform with the necessary precision. Also, each creates a color filter film which is located between the transparent common electrode and the individually-addressable pel electrodes. To increase the optical density (or color intensity) of color filters made by the above-described approaches, the thickness of the film may be increased. However, increasing the film thickness also increases the spacing between the transparent common electrode and the individually-addressable pel electrodes. As a consequence, the operating voltage of the device must be increased to offset the greater voltage drop through the liquid crystal layer. Further, in devices of the type described above, the color filter is spaced from the viewing surface by at least the thickness of the front glass panel. If the glass panel is relatively thick, parallax can become a concern.

One of the major problems with the approaches described above is the difficulty of maintaining registration or alignment between the pel electrodes and the color regions in the color filter layer. Many of the processes require multiple dyeing or deposition operations, during any one of which misalignment or improper deposition of color materials may occur. While it is possible to maintain precise alignment or registration in a laboratory environment on a low volume basis, it becomes much more difficult to do so in a high volume factory environment.

Still another approach uses photosensitive emulsion layers. A liquid crystal shutter device is used to sequentially expose predetermined areas of the photosensitive emulsion layers while the layers are flooded with light having the specific color. Three differently colored regions are formed by sequentially energizing three different groups of pel electrodes through associated thin film transistors. The latent images produced in the photosensitive emulsion layer are developed and the film is laminated to a glass substrate to form a multi-colored filter.

While this approach simplifies registration or alignment problems, it nevertheless retains the drawbacks of some of the other approaches discussed earlier. Multiple exposure operations to different colors of light are required along, apparently, with the step of laminating photosensitive emulsions to a glass substrate. The number of steps and the relative complexity of those steps necessarily must be reflected in the product cost.

SUMMARY OF THE INVENTION

The present invention is a thin film transistor liquid crystal display with color capabilities. Fabrication of the display does not require wet processing techniques but inherently provides alignment between the pel electrodes and associated color regions in the color filter layer.

The invention can be defined as a method of forming color regions in a liquid crystal display device assembly having spaced front and rear glass panels, a transparent common electrode layer on one of the glass panels and an array of individually addressable pel electrodes on the other of the glass panels. One of the glass panels is made of a polychromatic or full color photosensitive glass material. The method includes the steps of temporarily filling the cavity defined by the glass panels with a guest-host liquid crystal material. The assembly is illuminated with a light source directed at the non-polychromatic glass panel. Selected pel electrodes are energized for given periods of time to expose selected regions of polychromatic glass panel. The exposure "sensitizes" the glass in such a way that a subsequent heat treatment will produce a desired hue in those regions. Different sets of electrodes are energized in sequence to provide different amounts of exposure in different regions of the polychromatic glass panel.

BRIEF DESCRIPTION OF THE DRAWINGS

While the specification concludes with claims particularly pointing out and distinctly claiming that which is regarded as the present invention, details of preferred embodiments of the invention may be more readily ascertained from the following technical description when read in conjunction with the accompanying drawings wherein:

FIG. 4 is a flow chart of operations performed during fabrication of a thin film transistor liquid crystal display device in accordance with the present invention.

TECHNICAL DESCRIPTION

Figure 1:
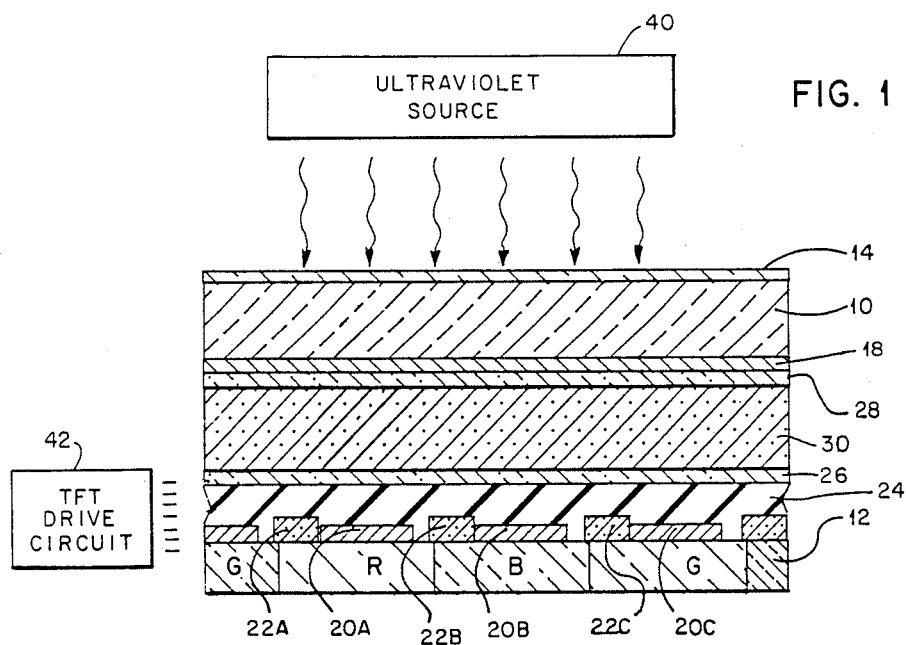
FIG. 1 is a partial cross section of a thin film transistor liquid crystal display as it appears during the fabrication process.

FIG. 1 is a partial cross section of a thin film transistor liquid crystal display which can be fabricated in accordance with the present invention. The display includes a transparent front glass panel 10, a rear glass panel 12, a polarizing filter 14, a transparent common electrode 18 and a plurality of individually-addressable pel electrodes 20A, 20B, 20C, etc. The pel electrodes may be individually addressed or energized through associated thin film transistors 22A, 22B, 22C, etc. The pel electrodes and thin film transistors are deposited directly on the rear glass panel 12 using known fabrication techniques and are covered by a layer 24 of insulating material. The layer 24 is, in turn, covered by an alignment film 26. A second alignment film 28 is deposited on the transparent common electrode 18. The space between the alignment films 26 and 28 is a cavity 30 which can be filled with a liquid crystal material. In accordance with the present invention, the described assembly is configured using known fabrication and alignment techniques. The cavity 30 is not sealed and remains empty during the initial assembly steps.

The rear glass panel 12 is made from a full-color photosensitive or polychromatic glass. Polychromatic glass is a commercially available glass material which can be processed using ultraviolet radiation and heat to form permanent colored regions within the glass. Depending on the parameters of the process, the color region may be confined to an area near the surface of the glass or may extend entirely through the glass. It should be noted that the use of polychromatic glass eliminates the need for a separate colored filter layer in the region between the common electrode and the individually addressable pel electrodes.

Polychromatic glass is a full color photosensitive glass developed and marketed by Corning Glass Company. Properties of the glass and methods for achieving a range of colors are described in U.S. Pat. Nos. 4,017,318 and 4,057,408 and in an article entitled, "Full-Color Photosensitive Glass," appearing at pages 5114–5122 of the Journal of Applied Physics, 49 (10), Oct., 1978. The color which is to be produced in a given region of polychromatic glass is determined by the length of time during which the glass is exposed to ultraviolet radiation. The exposure step itself does not produce the color, but does determine the hue that will be produced when the glass is subjected to subsequent heat treatment. The intensity or saturation of the color in an exposed region can be increased by a second exposure to ultraviolet radiation either concurrently with or followed by a second heat treatment.

The present invention is a technique for creating color regions in the polychromatic glass. The color regions are inherently aligned with the pel electrodes since the pel electrodes themselves are used to regulate the exposure of the polychromatic glass to ultraviolet radiation.

Figure 2:
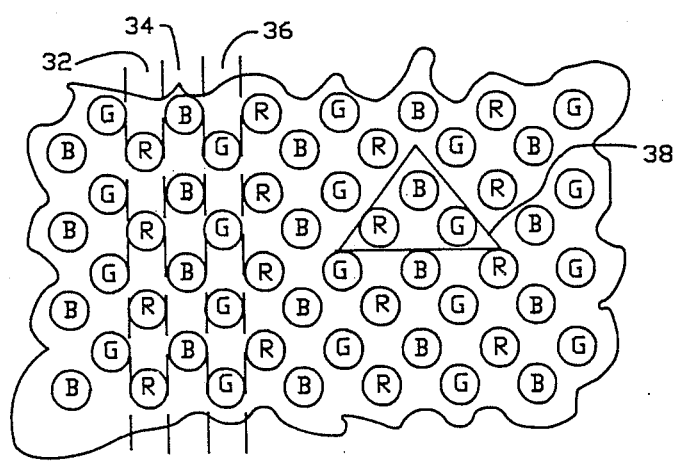
FIG. 2 is an enlarged plan view of a portion of a preferred color filter glass panel created in the course of the fabrication process.

The desired end result is illustrated in FIG. 2, which is a plan view of the polychromatic glass panel 12 after the formation of color regions. The color formation process creates adjoining columns 32, 34 and 36 of red, blue and green pels, respectively. The striped pattern is repeated across the width of the panel 12.

The color of each point in an image to be displayed is ultimately controlled by adjusting the amount of light transmitted through adjacent red, green and blue pels. For convenience, the pels may be considered as forming triads, such as triad 38, each consisting of a red pel, a blue pel and a green pel. For example, if the image point is to be pure red, the thin film transistor associated with the red pel is triad 62 is energized to cause the liquid crystal material aligned with the red pel to become transparent. The liquid crystal material aligned with the blue and green pels would remain opaque. As another example, if magenta were to be displayed, the thin film transistors associated with both the red and blue pels would be energized to allow only red and blue light to pass through the color filter.

The process for forming the color regions in the panel 12, which is substantially transparent in its unexposed state, is described briefly with reference to FIG. 1.

To produce color regions in the polychromatic glass panel 12, cavity 30 is temporarily filled with a guest-host liquid crystal mixture of positive dielectric anisotropy mixed with a small amount of pleochroic dye to form an "optical shutter" (colorless pels on a dark background). A temporary thin film transistors 22A, 22B, 22C, etc. The assembly is flooded with light produced by ultraviolet source 40. The thin film transistors associated with each of the different color regions are energized or driven for periods of time required to produce desired hues in different regions of the polychromatic glass panel 12. After the initial exposure to ultraviolet radiation, the liquid crystal material is drained from cavity 30 and the entire assembly is subjected to a heat treatment to fix the initially established hues.

The initial heat treatment is followed by a second exposure of all of the color filter regions in the polychromatic glass panel 12 to ultraviolet radiation. The second exposure may call for the cavity 30 to be refilled with the liquid crystal mixture and all thin film transistors in the array be driven or energized simultaneously. The second exposure step which actuates or intensifies the hues, can be carried out at room temperature. The liquid crystal mixture must be drained before the configuration is subjected to a second heat treatment step. The end result is a series of color regions in panel 12 integral with the polychromatic glass.

The foregoing description assumes the cavity 30 is to be refilled before the configuration is flooded with ultraviolet radiation. A simpler, and therefore preferred, method is to allow the cavity 30 to be drained following the initial exposure steps and to remain drained during the initial heat treatment, second ultraviolet exposure and final heat treatment.

It will be noted that the red, blue and green color regions in the glass panel 12, identified by the letters R, B, G, and inherently aligned with the pel electrodes formed on the surface of the glass panel 12. This is because the pel electrodes act as shutters which control the exposure of given areas in glass panel 12 to ultraviolet radiation provided by source 40.

Figure 3:
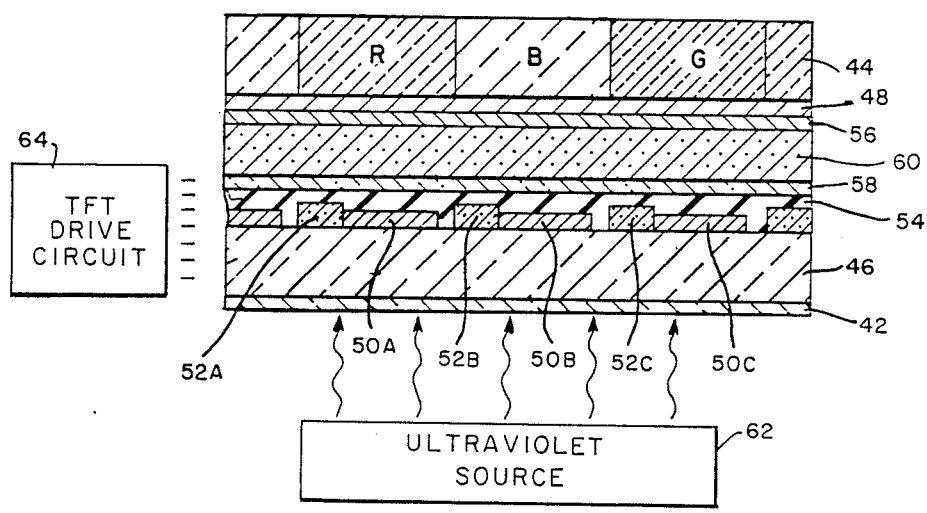
FIG. 3 is a partial cross section of a thin film transistor liquid crystal display illustrating an alternate fabrication process.

Although the structure shown in FIG. 1 provides the best alignment between the pel electrodes and the color regions associated with those electrodes, techniques similar to those described above may also be used to create color regions in the front glass panel of the liquid crystal device. Referring to FIG. 3, the basic device structure is the same and includes a polarizing filter 42, front glass panel 44, rear glass panel 46, transparent common electrode 48, individual pel electrodes 50A, 50B, 50C, etc., each with an associated thin film transistor 52A, 52C, 52C, etc., an insulating layer 54, alignment films 56 and 58 and the cavity 60 for liquid crystal material.

This structure differs from the previously discussed structure in that the front glass panel 44 is polychromatic glass. To form the color regions in panel 44, an ultraviolet source 62 is positioned to flood the rear glass panel with ultraviolet radiation. Thin film transistor drive circuits 64 sequentially energize the pel electrodes associated with the red, green and blue color regions to expose different regions of the front glass panel 64 for different periods of time.

FIG. 4 is a flow chart of the preferred steps that are performed in creating the color regions in the thin film transistor liquid crystal display. The steps are the same regardless whether the front glass panel or the rear glass panel is selected as the polychromatic glass panel. The solid components (i.e., the glass panels, the polarizing filter, the alignment films and the electrodes) are assembled (block 66) but the cavity which ordinarily receives the liquid crystal material is left unsealed and unfilled. The cavity is then filled (operation 68) with a guest-host liquid crystal mixture of the type described earlier. The temporary electrode drivers are connected (operation 70) to all of the thin film transistors in the device. Once the temporary electrical connections have been made, the assembly is flooded (operation 72) with ultraviolet radiation. The ultraviolet radiation must be directed at the side of the device which does not have the polychromatic glass panel. The thin film transistors to be associated with green color regions are driven (operation 74) for the period of time required for production of the green hues in the polychromatic glass panel. The thin film transistors with blue color regions and red color regions are then driven in sequential operations 76 and 78 for periods of time required for production of blue and red hues in different areas of the polychromatic glass panel.

After the initial exposure steps, the liquid crystal mixture is removed (operation 79) and the entire assembly is heat treated in an operation 80.

Additional information about the properties of polychromatic glass and method for achieving a range of colors are described in the previously referenced article and U.S. patents.

After the initial exposure and heat treating steps, the assembly is again flooded with ultraviolet radiation (operation 82) for a given period of time. The purpose of operation 82 is to make it possible to intensify the hues established in the initial exposure step. Since there is no liquid crystal material in cavity 30, all areas of the assembly are uniformly exposed during this step. The second exposure step is followed by a heat treatment operation 84 which actually produces the intensified hues.

When the exposure and heat treatment operations have been completed, the temporary electrode-drivers are disconnected (operation 86) and cavity 30 is filled with a final or permanent liquid crystal material in an operation 88.

The cavity containing the permanent liquid crystal material is sealed and permanent connections to the thin film transistors are made in a final operation 90.

While there have been described what are considered to be preferred embodiments of the present invention, variations and modifications in those embodiments will occur to those skilled in the art. Therefore, it is intended that the appended claims shall be construed to include both the preferred embodiments and all such variations and modifications as fall within the true spirit and scope of the invention.

What is claimed is:

1. A method of forming color regions in a liquid crystal display device assembly having spaced front and rear glass panels, a transparent, common electrode layer at the inside surface of one of the glass panels, an array of transparent, individually addressable pel electrodes at the inside surface of the other of the glass panels, one of the glass panels being made of a polychromatic glass material, said method comprising the steps of:
    filling the cavity defined by the glass panels with a guest-host liquid crystal material;
    illuminating the assembly with a light source directed at the non-polychromatic glass panel;
    energizing selected pel electrodes to expose selected regions of the polychromatic glass panel for a period of time sufficient to produce a desired hue;
    repeating the preceding step with different one of said pel electrodes until different regions of the polychromatic glass panel have been exposed for different periods of time; and
    heat treating the assembly to produce desired hues in the exposed regions.

2. A method as defined in claim 1 wherein the electrodes are energized for periods of time sufficient to cause the heat treatment step to produce red, green and blue hues in different regions of the polychromatic glass panel.

3. A method as defined in either of claims 1 or 2 including the additional steps of:
    removing the liquid crystal material from the cavity;
    heat treating the assembly at a predetermined temperature for a predetermined period of time to fix the hues produced in the polychromatic panel.

4. A method as defined in claim 3 wherein the heat treatment is performed at a temperature of approximately 450 degrees Centigrade for a period of approximately one hour.

5. A method as defined in claim 3 including the subsequent steps of:
   illuminating the entire assembly with the light source for a predetermined period of time to intensify the hues produced in the preceding steps; and
   heat treating the assembly a second time to fix the colors formed in the polychromatic glass panel.

6. A method as defined in claim 5 wherein the light source employed in the illuminating steps produces primarily ultraviolet radiation.

7. A method as defined in claim 6 wherein the illuminating steps are performed at room temperature.

8. A method as defined in claim 7 wherein the second heat treatment is performed at a temperature of approximately 400 degrees Centigrade for a period of approximately 15 minutes.

9. A method of making a thin film transistor, liquid crystal display device having color display capability, said method comprising the steps of:
   fabricating an assembly including spaced front and rear glass panels, a transparent common electrode layer at the inside surface of one of the glass panels, and an array of transparent, individually addressable pel electrodes at the inside surface of the other of the glass panels, each pel electrode having an associated thin film transistor through which the electrode may be addressed, one of said glass panels being made from a polychromatic material;
   filling the cavity defined by the glass panels with a guest-host liquid crystal material;
   illuminating the assembly with a light source directed at the non-polychromatic glass panel;
   addressing selected electrodes through the associated thin film transistors to expose selected regions of the polychromatic glass panel to the light source for a predetermined period of time;
   repeating the preceding step with different ones of the electrodes until different regions of the polychromatic glass panel have been exposed for different periods of time;
   draining the liquid crystal material from the cavity;
   heat treating the assembly;
   refilling the cavity with a suitable permanent liquid crystal material; and
   sealing the cavity.

10. A method as defined in claim 9 wherein the heat treating step is followed by the further steps of: illuminating the polychromatic glass panel for a period of time sufficient to establish desired color saturation levels in the previously exposed areas; and
   heat treating the assembly a second time.

11. A method as defined in claim 10 wherein the step of addressing the electrodes further comprises the steps of temporarily connecting circuits for driving the thin film transistors, performing the addressing steps and removing the temporarily connected circuits before performing further steps.

12. A method as defined in claim 1 wherein the electrodes are addressed for periods of time sufficient to cause red, green and blue hues to be produced in different regions of the polychromatic glass panel as a result of the heat treating step.

13. A method as defined in claim 12 wherein the light source used in the illuminating step produces primarily ultraviolet radiation.

14. A method as defined in claim 13 wherein the first heat treatment step is carried out at a temperature of approximately 450 degrees Centigrade for a period of approximately one hour.

15. A method as defined in claim 14 wherein the second heat treatment step is carried out at a temperature of approximately 400 degrees Centigrade for a period of approximately 15 minutes.

* * * * *